(12) United States Patent
Halalay et al.

(10) Patent No.: US 8,101,152 B1
(45) Date of Patent: Jan. 24, 2012

(54) SONOCHEMICAL SYNTHESIS OF TITANIUM-CONTAINING OXIDES

(75) Inventors: Ion C. Halalay, Grosse Pointe Park, MI (US); Michael P. Balogh, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/858,690

(22) Filed: Aug. 18, 2010

(51) Int. Cl.
*C01G 23/047* (2006.01)

(52) U.S. Cl. ........ 423/610; 423/598; 423/608; 423/611; 423/612; 106/437; 75/335; 75/345; 75/10.18

(58) Field of Classification Search .................. 423/598, 423/608, 610–612; 106/437; 75/335, 345, 75/10.18
See application file for complete search history.

(56) References Cited

U.S. PATENT DOCUMENTS

| | | | |
|---|---|---|---|
| 7,455,713 B1 | 11/2008 | Halalay et al. | |
| 7,465,333 B1 | 12/2008 | Halalay et al. | |
| 2005/0119398 A1* | 6/2005 | Zhang | 524/497 |
| 2008/0042305 A1* | 2/2008 | Halalay | 261/151 |

* cited by examiner

*Primary Examiner* — Jerry Lorengo
*Assistant Examiner* — Pritesh Darji
(74) *Attorney, Agent, or Firm* — Reising Ethington P.C.

(57) ABSTRACT

A titanium halide, preferably titanium tetrachloride, is reacted with suitable reductant, preferably an alkali metal or alkaline earth metal, under ultrasonic excitation in a liquid reaction medium to form nanometer size particles of titanium which may incorporate unreacted reductant. The nanosized titanium particles may be a precursor for nanosized titanium oxide which is formed by oxidizing the titanium, preferably with a low molecular weight alcohol. When the titanium particles incorporate unreacted reductant the oxidation reaction will yield nanometer sized titanates. The nanosized particles, whether titanium oxide or titanates may be extracted by first filtering them from the reaction medium, followed by washing with water to remove any water-soluble reaction products followed by spray drying.

10 Claims, 2 Drawing Sheets

SONOCHEMICAL SYNTHESIS OF TITANIUM-CONTAINING OXIDES

TECHNICAL FIELD

This invention is related to the formation of titania or titanates from titanium halides in a liquid medium and facilitated by the application of ultrasonic energy.

BACKGROUND OF THE INVENTION

Titanium-containing oxides, particularly as nanometer-sized particles, find utility in several technologies.

For example, nanophase titania ($TiO_2$) particles have photocatalytic properties which may be beneficial in improving the efficiency of electrolytic decomposition of water into hydrogen and oxygen. Titania nanoparticles can also be used in dye-sensitized solar cells to produce electricity, and because they very efficiently absorb ultraviolet wavelengths while being virtually transparent to visible light, titania nanoparticles may be used to provide UV protection.

Among titanates, barium tetra-titanate ($BaTi_4O_9$) and alkaline metal hexa-titanate ($M_2Ti_6O_{13}$; M=Na, K, Rb) are effective in promoting photolysis of water while lithium titanate ($Li_4Ti_5O_{12}$) shows promise as an electrode material for the anode in lithium cells.

Titania is conventionally produced by oxidation of titanium chloride, for example by burning it in oxygen together with another combustible gas (often carbon monoxide). By adding seed crystals, the titanium dioxide is formed as a fine solid in a gas stream and is filtered out of the waste gases. Crystal growth is controlled by adding nucleating agents to the gas stream and the products are cooled by mixing with chlorine gas. The product is then washed and dried before milling and surface treatment. This process yields particles of conventional (micrometer) dimensions.

Nanosized titania particles may be fabricated by a number of different approaches, both liquid-based and vapor- or gas-based. The liquid-based processes include: sol-gel processes; hydrolysis processes; a hydrothermal process; a micro-emulsion process: the gas-based processes include; chemical vapor deposition; flame synthesis; vapor condensation; and laser ablation.

Although processes for direct manufacture of nanosized titania have been developed, most of the processes for fabrication of titanates call for co-sintering mixed oxides in appropriate proportion. The resulting titanate is therefore obtained in bulk form and must be milled, or otherwise comminuted, to reduce it to nano dimensions.

Thus there is need for reaction schemes and processing capable of producing at least nanosize titanium-containing oxide particles.

SUMMARY OF THE INVENTION

Nanometer-size particles of titania (also known as titanium dioxide or titanium IV oxide) may be produced by oxidation of nanometer-size particles of titanium metal in a liquid medium while subjecting the liquid to ultrasonic vibrations. An alcohol such as ethanol is used for oxidizing the very small titanium particles to nanometer-size particles of $TiO_2$ or, as will be shown, to particles of a titanate of an alkali metal or an alkaline earth metal.

Nanometer-size particles of titanium metal may be produced by reduction of a titanium halide (for example, titanium tetrachloride) with a reductant metal in a liquid medium used for the reaction. The reaction may be conducted at close-to-ambient or modestly-elevated temperatures and at close-to-atmospheric pressure. The reduction of the precursor halide in the reaction medium is assisted using suitable cavitation practices, for example, a sonochemical process.

The reaction medium is an anhydrous, suitably low vapor pressure liquid that is not reactive with the precursor halide or the reductant metal(s). Anhydrous liquid hydrocarbons such as decalin, tetralin, decane, dodecane, and hexadecane are examples of suitable reaction medium materials. Liquids comprising silicon-containing molecules such as polydimethylsilanes may also be suitable. The liquid medium may be infused or covered with dry and substantially oxygen-free and water-free inert gas such as helium or argon to provide an inert atmosphere during processing.

The reductant for the precursor halide is suitably one or more of the alkali or alkaline earth metals such as lithium, sodium, potassium, rubidium, cesium, magnesium, calcium, and barium or alloys thereof. A preferred reductant is a low-melting point mixture of the reactants that can be dispersed, by application of ultrasonic vibrations to the liquid, as colloidal bodies in the liquid medium at a near-to-ambient temperature. For example, eutectic mixtures of sodium and potassium, such as $Na_{0.22}K_{0.78}$ are liquid at about room temperature and are effective reductants for precursor halides. A titanium halide is then added to the reaction medium, with its dispersed reductants, and reduced to titanium metal.

The process uses cavitation processes (preferably sonochemical practices) to disperse the reductant material in the liquid reaction medium and to promote the reduction of the precursor halides. A suitable vessel containing the liquid reaction medium is subjected to ultrasonic vibrations, using a transducer that generates sound waves in the liquid, at a frequency usually greater than about 20 kilohertz. The sonic energy causes the repeated formation, growth, and collapse of tiny bubbles within the liquid, generating localized centers of very high temperature and pressure, with extremely rapid cooling rates as heat is lost to the bulk liquid. It is preferred that the liquid reaction medium have a relatively low vapor pressure at processing temperatures so that the medium contributes little vapor to the high temperature regions in the cavitation bubbles. Meanwhile, the infusion of the inert gas (for example helium) into the liquid facilitates the formation of the cavitation bubbles with small atoms that will not react at the high temperature in the bubbles.

This cavitation processing first disperses the reductant metal in the hydrocarbon liquid reaction medium and then promotes the reaction of the reductant metal with the precursor halide when it is brought into contact with the liquid. When the titanium halide and reductant are present in stoichometric proportion, the reduced halide yields particles of titanium while the metal content of the reducing medium is oxidized to a corresponding alkali metal or alkaline earth metal halide salt(s). The reaction usually proceeds over a period of minutes to several hours and usually provides an essentially quantitative yield of the constituents of the halide(s) being treated.

Thus, as an example, titanium tetrachloride liquid is passed into hexadecane containing finely dispersed $Na_{0.22}K_{0.78}$ in stoichometric proportion and the products are titanium metal, sodium chloride, and potassium chloride. However, if desired, the reductant, in this example $Na_{0.22}K_{0.78}$ may be added in excess so that the reaction products are titanium metal, sodium chloride, and potassium chloride, and remnant $Na_{0.22}K_{0.78}$ closely associated with the titanium metal.

The temperature of the liquid medium increases somewhat from an ambient starting temperature, but typically only to a temperature of the order of 60° C. to less than 200° C. The reaction may be conducted as a batch process or on a continuous basis. The titanium products are often produced initially as very small particles, about 10 to 20 nanometers in size, and are frequently amorphous or, if crystalline, exhibit a very small crystallite size.

With the addition of an oxidizer, for example an anhydrous alcohol such as methanol, ethanol or propanol, in at least stoichometric proportion, and preferably in about 10% stoichometric excess, while still subject to sonication, the titanium particles will react to form titania. If the reductant is present in excess, titanates will form. For example, if lithium were the reductant and present in stoichometric excess, then lithium titanate would form.

An obvious advantage of this practice for producing titanium oxide or titanium-containing oxide materials is that the process may be conducted at only modestly elevated temperatures and even at close to ambient temperatures with relatively low consumption of energy. A further advantage is that the cavitation processing has the ability to mechanically fragment both the reductant and the titanium-containing oxide and may, by continually refining the dimensions of the reactants and the reaction products, promote the desired nano-sized oxides.

The titanium-containing oxides may be extracted by first filtering the liquid reaction medium to separate the solid fraction, which will include halides and oxides, from the hydrocarbon reaction medium preparatory to removal of the halides. The solid fraction may then be washed in water, repeatedly if necessary, to dissolve the halides and leave a dispersion of the desired titanium-containing oxides in water. This dispersion may then be filtered, centrifuged, decanted or spray-dried to collect the oxide particles.

DESCRIPTION OF PREFERRED EMBODIMENTS

Figure 1:
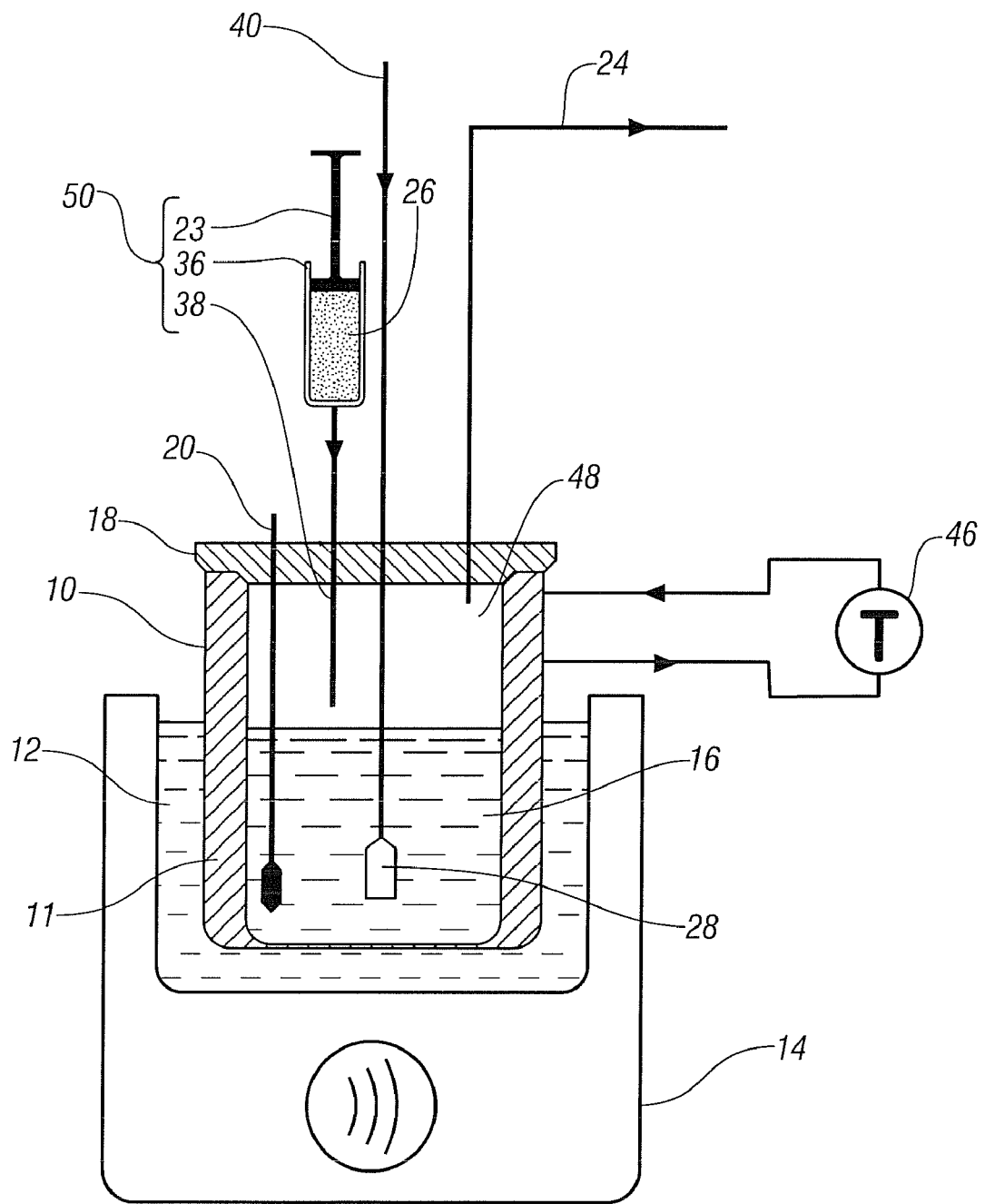
FIG. 1 is a schematic drawing of a reaction vessel for conducting the process of the invention.

The entire process may be conducted in a reaction vessel adapted for the sonication of reactive reactants, an example of which is shown in FIG. 1 and is adapted from the device described in US 20080042305 by Halalay.

Some features of this device include: a reaction chamber 10 for a liquid reaction medium 16 sealed by means of a hermetic feed through cover 18 incorporating a means of controlling the temperature of the medium 46 and a means of sensing the temperature of the medium 20; a means of inducing cavitation in the liquid reaction medium, comprising an ultrasonic generator 14 and an ultrasound transmissive medium 12; at least one reactant inlet 38 to the reaction chamber; an inert gas inlet conduit 40 with a sparger 28 for injecting a flowing stream of dry inert gas into the reaction chamber; a venting outlet for removal of a stream of the inert gas from the reaction chamber 24; and a recirculation conduit for re-circulating a stream of the inert gas from the venting outlet to the inert gas inlet conduit (not shown).

The process of preparing titania particles or titanate particles is initiated by introducing a liquid reaction medium 16 which may be a low vapor pressure hydrocarbon such as decane, dodecane, tetralin or decalin in the reaction vessel 10 under dry inert gas atmosphere 48 which may be, for example, argon or helium. Preferably, the dry inert gas atmosphere will be recirculated by venting through outlet 24 and re-introduced to the reaction vessel through inlet 40. More preferably, the gas will be passed through reaction medium 16 using a sparger 28 to partially dissolve the gas in the reaction medium 16 and promote bubble formation on sonication. Any of the liquid reaction media listed may be used in combination with any reductant, but for most efficient dispersion of the reductant it is preferred that the reductant be present as a liquid so that it may form an emulsion with the reaction medium. The preferred reductants and their approximate melting points (MP) are: lithium (MP=181° C.), sodium (MP=98° C.), potassium (MP=64° C.), rubidium (MP=39° C.), cesium (MP=29° C.), magnesium (MP=650° C.), calcium (MP=839° C.), and barium (MP=725° C.). It is preferred that the higher boiling point reaction media, that is dodecane (Boiling Point, BP=216° C.) and Hexadecane (BP=287° C.), be employed when lithium or lithium-based reductants are employed. Use of these liquid reaction media, in conjunction with elevated temperature processing facilitated by temperature controller 46 and sensor 20, may enable employing lithium in its liquid state to achieve more rapid dispersion of the lithium in the liquid reaction medium. Obviously magnesium, calcium and barium, if used, will be present as solids.

If titanates of mixed composition are acceptable or preferred, mixed or alloyed reductants may be employed. This alloyed approach, with appropriate choice of alloy may generally be beneficial in lowering the temperature required to render the reductant liquid. For example a 22 weight percent sodium-78 weight percent potassium eutectic ($Na_{0.22}K_{0.78}$) alloy melts at an appreciably lower temperature, about −12.6° C., than its constituent metals, and all sodium-potassium alloys in concentrations ranging from 40-90 wt % potassium, are liquid at room temperature, about 25° C.

A pre-determined quantity of reductant 26 is dispensed by device 50 comprising actuator 23, holding container 36 and reactant inlet 38, into liquid reaction medium 16. As depicted the reductant is a liquid capable of discharge through a reactant inlet under pressure. Those skilled in the art however will readily appreciate that for example, an airlock chamber (not shown) with means of discharging solid reductant into reaction chamber 10 could be substituted if solid reductants were used.

The mixture of liquid reaction medium and reductant is then subjected to sonication using ultrasonic generator 14. Sonication is intended to promote cavitation and jet-based cavity collapse which will fragment the metal particles or disperse liquid reductant and is continued for sufficient time to render a colloidal suspension or emulsion of the reductant in the reaction medium. Sonication may be performed at frequencies of from 20 to 50 kilohertz (kHz). Suitable power levels will generally scale with the volume of reaction medium-reductant in reaction chamber 10. Sonication power levels of 100 to 1000 watts per liter applied to reaction medium-reductant mixture will yield the desired result in acceptable times, typically 20-40 minutes. Some power losses will occur during transmission of the ultrasound through transmissive medium 12. If these transmission losses are excessive, the power capability of the ultrasonic generator 14 should be adjusted appropriately to ensure delivery of the desired power density to the reaction medium 16.

After the reductant has been processed to a colloidal suspension, sonication is maintained as anhydrous titanium halide is introduced to the reaction vessel 10. Preferably the halide is titanium tetrachloride (MP=−24° C.) since it may be may be added to reaction chamber 10 as a liquid at ambient temperature by a charging device (not shown) analogous to dispenser 50. But titanium tetrabromide (MP=39° C.) or titanium tetraiodide (MP=150° C.) may also be used with appropriate adjustments to the procedure followed in charging them to reaction chamber 10.

If the halide is added in stoichometric proportion, substantially all the finely divided reductant will be available for reaction and consumed to form finely divided titanium nanoparticles and reductant halide as reaction products. Typical dimensions of the titanium nanoparticles formed in this step have been observed to range from about 10 to about 20 nanometers. If the halide is added in less than stoichometric proportion, or, equivalently, the reductant is present to excess, the reaction products will be a metallic mixture of reductant and titanium with at least an alkali metal or alkali earth halide.

Sonication is an important contributor to the progress of either of the reactions—to titanium or a titanium reductant mixture—since the reductant halide, which forms in conjunction with the titanium metal particles is a solid, insoluble in the reaction medium. Potentially such halides could coat the titanium particles and block or restrict access of the reactants causing the reaction to terminate or slow before all the reactants have been consumed. However the sonication-induced dispersion or emulsification of the reductant increases the exposed reactive surface area of the reductant. Also, the continued sonication as reaction proceeds may be effective in dislodging the halide to continually expose fresh reactive surface in the reductant.

Addition of a low molecular weight alcohol such as methanol, ethanol or propanol to reaction vessel 10 after formation of titanium will promote oxidation of the titanium to titania with formation of the related alkane according to:

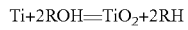

where R is an alkyl group.

If some reductant (X) is present, it will react with the alcohol as:

or, since the titanium and reductant are intimately mixed, the overall reaction product will be a mixed reductant metal-titanium oxide or a reductant titanate. At the conclusion of the procedure, the reaction vessel will contain a suspension of titanium oxide or reductant titanate in the initial reaction medium in combination with a suspension of the earlier-formed reductant halide. The alcohol should be added in at least stoichometric proportion, and, preferably, in about 10% excess to stoichometric proportion.

These suspensions may be agitated, either by continued sonication or by aggressive gas flow through inlet 40 and sparger 28 to maintain them as a dispersion so that they may be filtered to separate the titania and reductant halide or titanate and reductant halide from the liquid reaction medium 16. The filter mixture may then be washed with water, dissolving the reductant halide and separating it from the titania or titanate. Repeatedly pouring off the halide solution and rewashing, the titania or titanate particles may be required to reduce the halide concentration to preferred levels.

Once washed, the titania or titanate particles may be dried. A preferred approach is to inject the particle-containing aqueous dispersion into a spray-dryer so that the titania or titanate particles may be dispersed, dried and collected as individual particles without risk of agglomeration and loss of their nano-size characteristic. Such a procedure generally allows for a significant portion of the particles to be collected as a very fine white powder comparable in size to the metal particles from which they formed, which in the case of titanium particles, may be about 10-20 nanometers.

After collection, the oxide particles may be subjected to thermal processing to modify the particle size or morphology, for example, by exposure to high temperatures for extended periods to promote particle coarsening and coalescence. The oxide particles may also be assembled into structural forms using powder processing techniques well those to those skilled in the art.

The procedure may be best understood by consideration of a specific example.

EXAMPLE

In an exemplary procedure, 1.25 grams (35.2 millimol) of $Na_{0.22}K_{0.78}$ was dispersed in 125 ml of hexadecane. Then 0.54 g (8.40 millimol) of $TiCl_4$ was added to the dispersed reductant metal. Thus, an excess of the alkali metal reductant was used. The $TiCl_4$ was added over a period of about thirty minutes. The sonication time (after $Na_{0.22}K_{0.78}$ dispersion) was 60 minutes. The temperature of the materials in the vessel, un-cooled, except by heat loss to ambient air, increased from about 25° C. to about 80° C. due to the input of sonic energy and the exothermic reaction which produced dark or black-colored particles. After about an hour of product particle sedimentation, the clear reaction medium above the black-colored particles was removed by decantation. The solids were washed three times with pentane, then, again under sonication, reacted with methanol in about 10% stoichometric excess and, finally, washed with water. The washed solids were dried in a vacuum oven.

Figure 2:
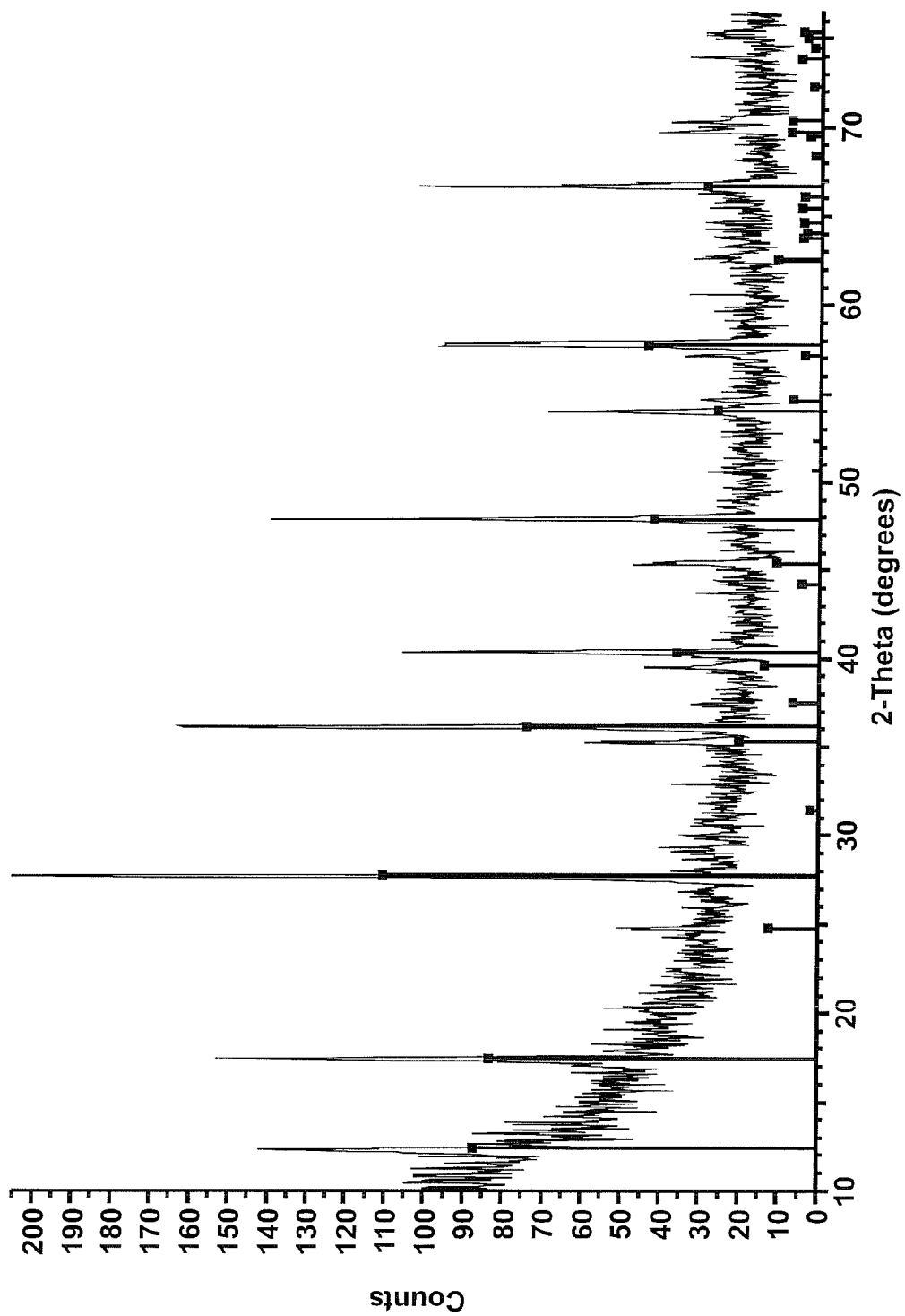
FIG. 2 is an plot of X-Ray intensity versus diffraction angle 2-Theta for a particular titanate made by the practice of this invention on which has been superimposed vertical bars corresponding to the relative intensity and 2-Theta angle for peaks of a reference titanate.

An X-ray diffraction pattern of the mixed oxide ($K_{1.3}Ti_8O_{16}$) formed as described above, and, annealed to coarsen the crystallites, is shown as the continuous curve of FIG. 2 which shows the X-ray intensity (measured as the counts recorded by an x-ray detector) as a function of the diffraction angle 2-Theta. As a result of the increased crystallite size the diffraction peaks show little line broadening and the major peaks may readily be identified. The locations and relative heights of the intensity peaks expected for this oxide are indicated as vertical bars capped by squares extending from the x-axis of the graph. Clearly the agreement between the measured and predicted major peaks is excellent.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for forming nanometer-size particles of a titanium-containing oxide, comprising the steps of:
   adding a reductant to a liquid reaction medium maintained at a pre-determined temperature and contained in a reaction vessel under a dry inert gas atmosphere:
   sonicating the mixture of reductant and liquid reaction medium to finely disperse and uniformly distribute the reductant throughout the reaction medium;
   adding a titanium halide to the dispersion of reductant and liquid reaction medium to form a first reaction mixture while sonicating the first reaction mixture;
   holding the first reaction mixture for a time sufficient to enable substantially-complete reaction between the reductant and the titanium halide and form a first reaction product mixture comprising nanometer-size particles of titanium;

adding an oxidant to the first reaction product mixture to form a second reaction mixture comprising the titanium particles while sonicating the second reaction mixture;

holding the second reaction mixture for a time sufficient to enable substantially-complete reaction between the oxidant and the titanium particles to form a second reaction product mixture comprising a nanometer-size particles of a titanium-containing oxide; and separating the particles of titanium-containing oxide from the remainder of the second reaction product mixture.

2. The method of claim 1, wherein the reductant comprises at least one of the group consisting of lithium, sodium, potassium, rubidium, cesium, magnesium, calcium, and barium.

3. The method of claim 1 wherein the liquid reaction medium is at least one of the group consisting of decane, dodecane, decalin, tetralin and hexadecane.

4. The method of claim 1 wherein the oxidant is a low molecular weight alcohol of the group consisting of methanol, ethanol and propanol.

5. The method of claim 1 wherein the titanium halide is at least one of the group consisting of titanium tetrachloride, titanium tetrabromide and titanium tetraiodide.

6. The method of claim 1 wherein the titanium-containing oxide substantially comprises titanium dioxide.

7. The method of claim 1 wherein the titanium-containing oxide is a titanate.

8. The method of claim 1 wherein the predetermined temperature is between 20° C. and 200° C.

9. The method of claim 1 wherein the reductant is present in molar excess with respect to the titanium halide.

10. The method of claim 1 wherein separating the particles of titanium-containing oxide from the remainder of the second reaction product comprises:

filtering the second reaction product mixture to separate the mixture into a liquid fraction and a first solid fraction;

washing the solid fraction to dissolve all water-soluble reaction products;

filtering the resulting solid-containing aqueous solution and retaining a second solid fraction;

repeating the previous washing and filtering steps until substantially all water-soluble reaction products have been removed; and re-dispersing the solid fraction and spray-drying the dispersion.

* * * * *